Sept. 19, 1933.  A. SCHMIDT, JR  1,927,809
ELECTRIC DISTRIBUTION SYSTEM
Filed Sept. 19, 1931
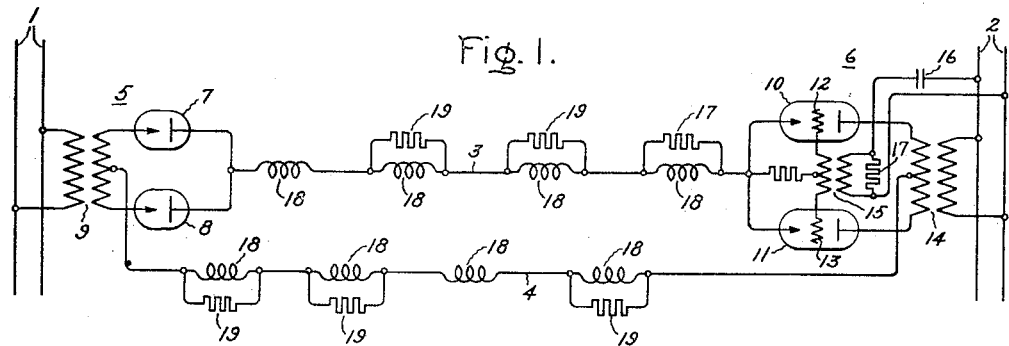
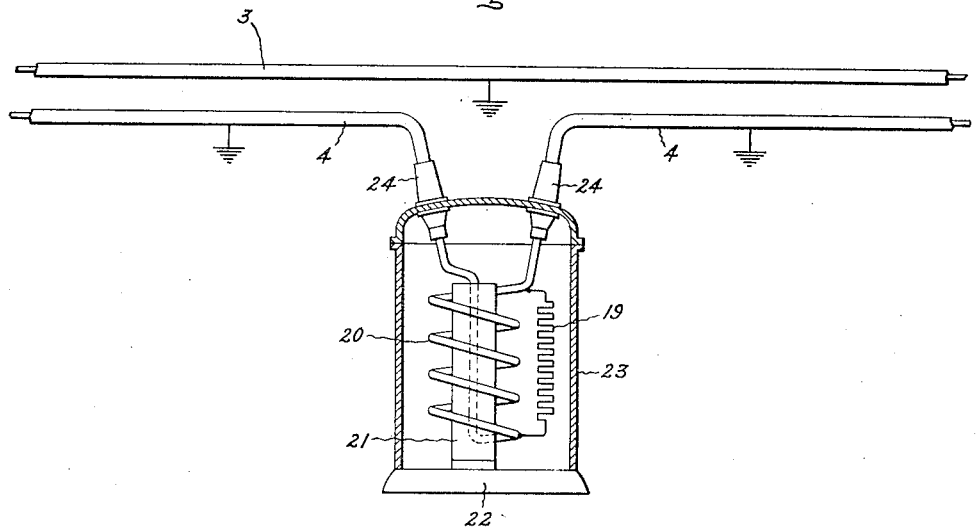
Inventor:
August Schmidt, Jr.
by Charles N. Mullen
His Attorney.

Patented Sept. 19, 1933

1,927,809

UNITED STATES PATENT OFFICE 1,927,809

ELECTRIC DISTRIBUTION SYSTEM

August Schmidt, Jr., Schenectady, N. Y., assignor to General Electric Company, a corporation of New York Application September 19, 1931
Serial No. 563,807

6 Claims. (Cl. 171—97)

My invention relates to electric systems having electrostatic capacity, and more particularly to the protection of high voltage, direct current, electric distribution, or transmission, systems.

High voltage, long distance, direct current electric power transmission has long been the goal of many electrical engineers. Such a system has the advantage, over the usual high voltage, alternating current transmission systems, that it has lower losses because of the fact that in direct current systems the current and voltage are always in phase and consequently no wattless current can flow in the transmission circuit. Furthermore, direct current systems cannot cause inductive interference with neighboring communication circuits, as is often the case with alternating current power transmission circuits.

With the ultimate perfection of static electric valve converting apparatus for both rectifying alternating current into direct current and inverting direct current into alternating current, the voltage limits and the possibilities of the practical realization of high voltage, long distance, direct current transmission of electric power will be greatly increased.

It is believed by many that if high voltage direct current transmission becomes more important commercially in the future that most, if not all, of the transmission circuits will be underground cable circuits. This is for a number of reasons, among which are that the same cable can be operated at higher direct current voltages than alternating current voltages; that in a direct current cable circuit there is no charging current to contend with; and also that in a direct current circuit the power factor is always unity thus increasing the copper efficiency of the cable. All three of these reasons tend to reduce the relative cost of cable transmission with direct current as compared with alternating current.

In a direct current circuit the outgoing and return conductors of the circuit have a substantially constant difference of potential equal to the potential of the circuit and consequently this circuit is the equivalent of an electrical condenser of which the different potential outgoing and return conductors form the plates. In long distance, high voltage, direct current cable circuits, such for example as a hundred mile cable circuit operating at 100,000 volts, the stored up energy due to the shunt electrostatic capacity of the cable will be very great and the destructive effect of a short circuit might be enormous.

In order to prevent the too rapid discharge of the stored energy of such a cable circuit, I propose to connect a reactor, or a plurality of reactors at intervals, in the cable circuit. During normal operation of the circuit such reactors will have no appreciable effect because the current in the circuit will be substantially at a steady value. However, if a short circuit occurs the tendency of the stored electrostatic charge on the conductors of the circuit to flow through these conductors to the short circuit will be retarded by the reactor, or reactors. By reactor I mean any device having electromagnetic inductance which is capable of being connected in a direct current power circuit. It is believed that by the use of such reactors the rate of discharge of the electrostatically stored energy of the cable circuit may be so reduced as greatly to reduce the destructive power of a short circuit.

Due to the current surge (or surges) which is produced by a short circuit on such a cable circuit, the voltages across the reactors may become dangerously high and accordingly I also propose to provide means for limiting the voltage rise across these reactors so as to protect them.

It is an object of my invention to provide a new and improved arrangement for limiting the discharge rate of an electrostatic capacitance.

Another object of my invention is to provide protective means for limiting the destructive power of short circuits on high voltage direct current transmission circuits.

My invention will be better understood from the following description taken in connection with the accompanying drawing, and its scope will be pointed out in the appended claims.

In the drawing, Fig. 1 is a system, embodying my invention, for transmitting direct current between a pair of alternating current power systems; and Fig. 2 is a detailed view of a part of a direct current cable transmission circuit in which is included a reactor in accordance with the principles of my invention.

Referring now to Fig. 1 of the drawing, 1 and 2 are a pair of alternating current distribution circuits, or systems, between which it is desired to transmit power by direct current. The direct current transmission circuit consists primarily of a pair of conductors 3 and 4. Assuming that it is desired to transmit energy from system 1 to system 2, the left-hand ends of conductors 3 and 4 will be connected to a rectifying arrangement 5 and their right-hand ends will be connected to an inverting equipment 6.

Rectifier 5, which may be any one of a number of well known types, is illustrated as of the vapor electric discharge type. It comprises a pair of unidirectional conducting, vapor electric discharge devices 7 and 8, which are connected to conductor 3 and the secondary winding of a power transformer 9, which is preferably a step-up transformer. Conductor 4 is connected to the electrical mid-point of the secondary winding of transformer 9. This arrangement results in a well known type of full wave rectifier which is so arranged that conductor 4 becomes the positive conductor with respect to conductor 3.

The inverting apparatus 6 may be any one of a number of well known types, and as illustrated, it is one of the simpler types of vapor electric inverters including a pair of controlled electric valves 10 and 11 of the type known in the art as a parallel inverter, such as described and claimed in United States Letters Patent No. 1,800,002, granted April 7, 1931, upon an application of Ernst F. W. Alexanderson. These valves 10 and 11 are essentially unidirectional conducting devices whose conductivities may be controlled by means of control electrodes, or grids 12 and 13, respectively. These valves 10 and 11 are connected to a power transformer 14 which in turn is connected to the receiving alternating current circuit 2. By alternately rendering valves 10 and 11 conductive at a frequency corresponding to the frequency of the circuit 2, it will be obvious that currents of reverse direction will flow in the winding of transformer 14, which is connected to the valves and this current will induce an alternating current in the winding connected to circuit 2. By properly timing the conductivities of the valves with respect to the instantaneous polarity of circuit 2, power may be forced into this circuit. As circuit 2 is an alternating current circuit a very convenient way of suitably controlling the conductivities of valves 10 and 11 is by energizing their control electrodes 12 and 13 from the circuit 2. Thus, a grid transformer 15 has its primary winding connected across receiving circuit 2 and its secondary winding connected respectively to the grids or control electrodes 12 and 13.

The valves 10 and 11 have the property of being capable of conducting current whenever their anodes are positive with respect to their cathodes, provided that their grids are above a certain critical potential with respect to their cathodes, but thereafter their grids have no effect and these valves will continue to conduct current so long as their anodes remain positive with respect to their cathodes. Due to this latter property of the valves and to the fact that it is necessary in an inverter to operate the valves against the counter-electromotive force of the alternating current receiving system, it is necessary, in order to secure current commutation between the valves, to advance slightly the phase of the grid potentials of the valves with respect to the phase of the counter electromotive force which is, of course, in phase with the voltage of the receiving system. Any suitable means may be employed for this purpose and as I have shown, I employ a simple phase advancing condenser 16 connected in the circuit for supplying the grid transformer. It is also preferable to provide a resistor 17 connected in parallel with the primary winding of the grid transformer 15, so that by properly proportioning the values of condenser 16 and resistor 17, the voltage of the grid transformer may be made to slightly lead in phase the voltage of circuit 2.

Assume now that valve 10 is conducting current. Remembering that this valve is part of an inverter for supplying energy from a direct current to an alternating current circuit, it will be realized that the counter electromotive force in the primary winding of transformer 14 will be such as to tend to oppose this flow of current and as this voltage is inserted in a loop circuit including both valves in series opposition, this counter-electromotive force will be in the direction of the conductivity of valve 11. Due to the advancing of the phase of the grid potentials of the two valves, the arrangement is such that the grid 13 becomes positive with respect to its cathode shortly before the counter-electromotive force in the primary winding of transformer 14 becomes zero and as both valves have the same direct current potential applied thereto, and as the counter-electromotive force tends to cause a current to flow in valve 11 and to stop the current flow in valve 10, valve 11 will start and valve 10 will go out until 180 degrees later the reverse operation will take place and valve 10 will start and valve 11 will go out.

As has been previously pointed out, if the conductors 3 and 4 extend for long distances and if their difference in potential is large, they will have stored therein a large amount of electrostatic energy. In order to prevent the sudden dissipation of this energy should an accidental short circuit occur between conductors 3 and 4, I connect in series relation in each of these conductors one or more inductances or reactors 18. Upon the occurrence of a short circuit between conductors 3 and 4, the natural tendency will be for the stored electrostatic energy of the condenser, which is formed by these conductors suddenly to discharge at the point of short circuit and consequently current will flow along each of the conductors toward the fault. By placing the reactors in the circuit, the sudden increase in the rate of flow of the current through the reactors will cause the reactors to store the energy represented by this sudden increase in current into electromagnetic fields surrounding them. Therefore instead of the sudden dissipation of the electrostatic energy of the circuit upon a short circuit, part of this energy will be immediately dissipated while a part of it will be converted into the electromagnetic energy in the fields surrounding the reactors and subsequently this electromagnetic energy will also be dissipated, but due to the length of time required for this conversion the instantaneous power developed at the short circuit will be greatly reduced.

It is possible that in some cases the electrostatic energy of the circuit may be so great that the current surge upon a short circuit will cause extremely high voltages to be produced across the reactors with the result that they may arc over or their insulation and the cable insulation may be destroyed. In order to prevent this I provide voltage limiting means for these reactors. These voltage limiting means may be any one of a number of different voltage limiting arrangements and as illustrated, I may utilize relatively high resistances 19 connected across the inductive windings of the reactors. These resistances 19 serve to limit the voltage across the reactive windings because as the voltage increases the ratio of the currents in the resistors to the currents in the reactors increases, thereby decreasing the rate of rise of the current through the reactors and consequently the rise in voltage across them.

In Fig. 2 is shown a detailed view of a cable circuit in which is inserted a reactor. It should be understood that this reactor is merely illustrative and that it may take any one of a number of forms. As illustrated, this reactor comprises a coiled conductor 20, which is supported by any suitable means 21, upon a base 22, and which is surrounded by a suitable housing 23. Suitable bushings 24 serve to insulate the ingoing and outgoing cable conductors. The voltage limiting resistor 19, which may or may not be employed as desired, is shown connected across the inductive winding 20 of the reactor.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:—

1. In combination, an arrangement which is adapted to store a relatively large charge of electrostatic energy comprising a pair of conductors separated by a dielectric, and means for decreasing the rate of discharge of said arrangement including an inductive reactance electrically connecting portions of one of said conductors.

2. In combination, a direct current high voltage long distance power transmission system including insulated underground cable conductors, and inductive reactances connected at intervals in said conductors.

3. In combination, a high voltage long distance direct current cable whose shunt capacity is adapted to store a relatively large amount of electrostatic energy, and means comprising reactors connected at intervals in the conductors of said cable for limiting the rate of discharge of said energy when said cable is short circuited.

4. In combination, a source of high voltage direct current, a transmission circuit including a plurality of conductors connected to said source, the instantaneous current resulting from a discharge of the electrostatic energy of said circuit by a short circuit thereon being normally in excess of the instantaneous short circuit current of said source, and inductive reactances connected at intervals in said conductors to limit the instantaneous current resulting from a discharge of the stored electrostatic energy of said circuit by a short circuit thereon.

5. In combination, a source of high voltage direct current, a transmission circuit having a relatively high electrostatic capacity, and reactors connected at intervals in the conductors of said circuit.

6. In combination, a direct current circuit comprising insulated conductors forming an arrangement having electrostatic capacity, means for limiting the rate of electrostatic discharge of said arrangement, and means for limiting the voltage rise across said first mentioned means.

AUGUST SCHMIDT, Jr.